United States Patent [19]
Redon

[11] 3,976,851
[45] Aug. 24, 1976

[54] LOAD LIMITER
[75] Inventor: Georges Redon, Orleans, France
[73] Assignee: Unelec, Paris Cedex, France
[22] Filed: July 30, 1975
[21] Appl. No.: 600,478

[30] Foreign Application Priority Data
July 31, 1974 France ............................ 74.26600
June 13, 1975 France ............................ 75.18486

[52] U.S. Cl. ............................................. 200/85 R
[51] Int. Cl.² ......................................... H01H 3/14
[58] Field of Search ............. 200/85 R; 212/39 DB, 212/39 MS; 254/173 R, 174 R; 340/272

[56] References Cited
UNITED STATES PATENTS
2,462,041  2/1949  Holer ............................. 200/85 R
2,512,055  6/1950  Dillon ............................ 200/85 R Primary Examiner—David Smith, Jr.
Attorney, Agent, or Firm—Haseltine, Lake & Waters

[57] ABSTRACT

Load limiter making it possible to set off an electric signal subsequent to a tensile stress exceeding a certain maximum value. It is based on the principle of rotation by axial stretching of a twisted part, the said rotation displacing an armature of an electric contact switch.

11 Claims, 3 Drawing Figures

LOAD LIMITER

The present invention concerns a load limiter connected with a lifting device and whose function is to send out an electric signal when the maximum permissible load is exceeded.

It is known that a hoist consists of a winch mounted on a frame, a drum provided with a hook and a lifting cable passing on the drum and anchored to a fixed point on the frame. For safety conditions, a load limiter, generally arranged between the fixed point and the lifting cable, is, moreover, provided. That load limiter is a flexible mechanical device which, on stretching, moves a contact interrupting an electric circuit, which can be used for causing either a luminous or sound warning or making operative a lift prohibiting device. Up till now, the principle of the load limiter was based on flattening, under the effect of the load, of spring washers, superimposed and perpendicular to the cable, that flattening causing the moving of a pin in the same direction as the cable. An electrical micro-contact integral with the pin is then actuated when the armature of the micro-contact reaches a stop which is integral with the housing constituting the load limiter.

The disadvantage of the former load limiters resides in the fact that they have a considerable lost height, that is, distance between the fixing point and the highest position of the hook. Now that lost height is increased by the presence of a load limiter of conventional design, whose longitudinal dimensions in the direction of the effort are relatively great and which require intermediate connection elements for the cable, such as wedge boxes which further increase the lost height.

The load limiter according to the present invention obviates these disadvantages. In the latter, indeed, the device has a lost height which is not prohibitive both subsequent to the slight dimensions in the direction of the stress and due to the direct fixing of the cable coming from the drum at the bottom end of the load limiter.

The present invention relates to a load limiter for lifting devices, setting off an electric signal when a vertical tensile stress is greater than a maximum value and constituted by a housing, a flexible system subjected to the said vertical tensile stress adapted to actuate, due to its movement, an electric contact switch, characterized in that the said flexible system is previously twisted in its middle part and stretches by rotation in a plane perpendicular to the direction of the vertical stress.

According to a first preferred embodiment of the invention, the said flexible system comprises a longitudinal metallic element previously deformed in its middle in a direction perpendicular to its length and to which is fixed a strip plate perpendicular to and integral with the deformed part of the element, the said strip plate being adapted, when rotating, to actuate the said electric contact switch.

According to another preferred embodiment of the invention, the said flexible system comprises two parallel longitudinal metallic elements spaced apart from each other, connected together at their ends to form an upper yoke and a lower yoke, each deformed at its middle by rotation in a direction perpendicular to its length and to which is fixed a strip plate perpendicular to and integral with the deformed parts of the said elements, the said strip plate supporting an electric contact switch whose armature is adapted to be actuated at the time of a rotation due to a stop integral with the said housing.

According to another preferred embodiment of the invention, the said electric contact switch is integral with the said housing, the armature of the electric contact switch being set off by the rotation of the said strip plate.

According to another preferred embodiment of the invention, the said flexible system is arranged laterally in relation to the axis of the said vertical stresses.

According to another preferred embodiment of the invention, the load limiter comprises a lower block and an upper block having a substantially parallelepipedical shape, fixed together by a common part whose width is narrow in relation to the horizontal width of the two blocks, the said common part being situated in a space comprised between a first vertical edge of the two blocks and the mid-perpendicular passing through the said horizontal width, the said flexible system being arranged on the second vertical edge opposite to the said first vertical edge in a space comprised between the two blocks.

According to another preferred embodiment of the invention, a connection element between the said two blocks is arranged between the said second vertical edge and the said midperpendicular, that connection element having a play enabling the said flexible system to be deformed notwithstanding.

According to another preferred embodiment of the invention, the said flexible system is provided with a strip plate parallel to the said horizontal width of the two blocks adapted to actuate a micro-contact integral with one of the blocks and arranged between the said first vertical edge and the said common part.

According to another preferred embodiment of the invention, each of the said upper and lower blocks is provided with a hollowed out part whose axis is substantially that of the said common part, and whose outside edge is stopped up by a removable cam and contains a blocking wedge used for blocking the lifting cable wound round the said wedge.

According to another preferred embodiment of the invention, the said upper block is provided with a fixing orifice and the lower block is provided with a hollowed out part whose axis is substantially that of the said common part, that hollowed out part having an outside edge which is stopped up by a removable cam and containing a blocking wedge adapted to block the lifting cable wound round the said wedge.

According to another preferred embodiment of the invention, the said upper block is provided with a fixing orifice and the said lower block is provided with a pulley.

With reference to the accompanying diagrammatic FIGS. 1 to 3, an example of embodiment of the present invention will be described hereinbelow, that example being given purely by way of an illustration having no limiting character.

Figure 1:
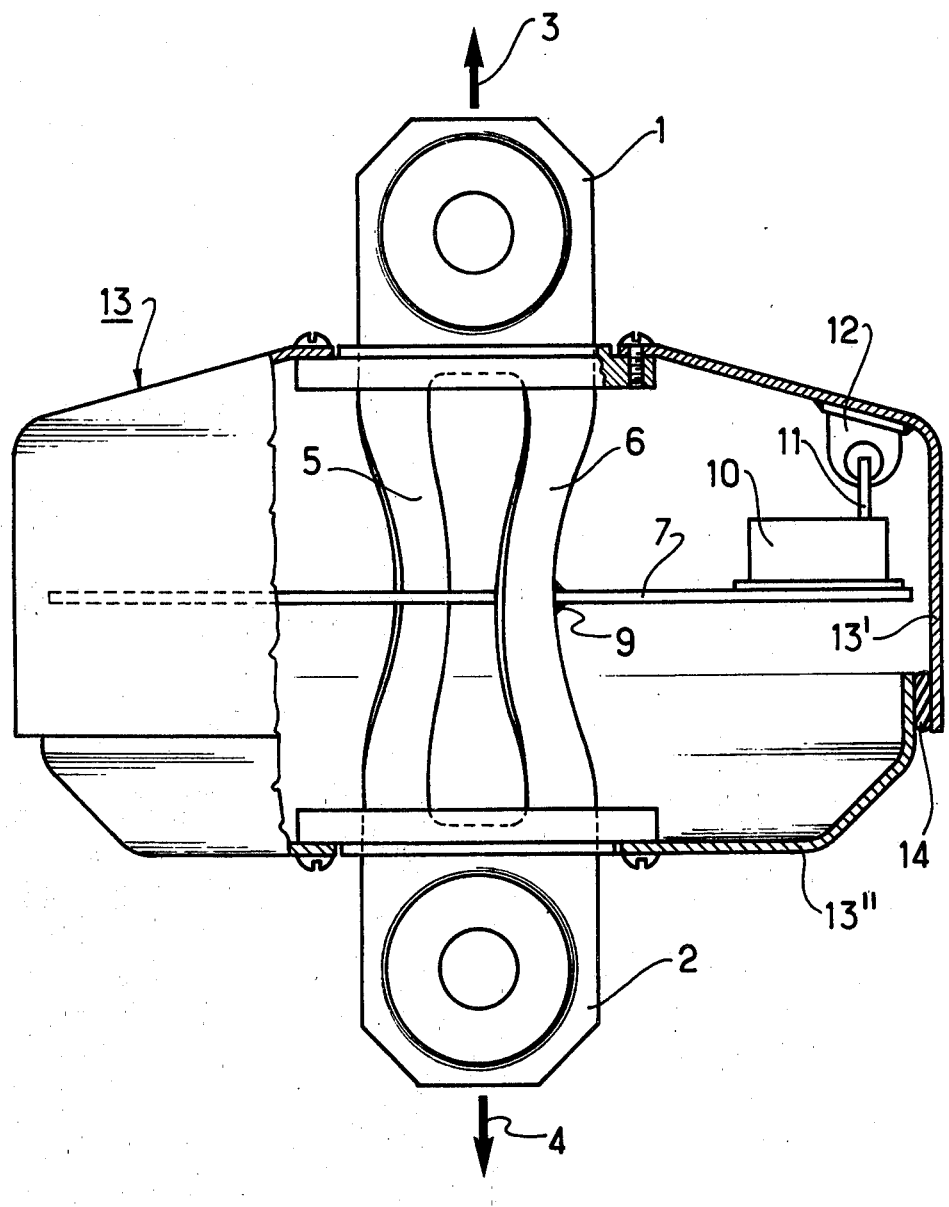
FIG. 1 shows diagrammatically a cross-section view and a partial elevation of a load limiter.

As will be seen in FIG. 1, there are two fixtures, the one, 1, an upper fixture, the other, 2, a lower fixture, constituting two yokes for the passing of two cables, the one going towards the fixed point of the hoist, the other going towards the hook. The direction of the stresses affecting the two fixtures 1 and 2, which may be of several tons, is indicated by the arrows 3 and 4 in the opposite direction. Between the two fixtures 1 and 2, integral with them, two metallic elements 5 and 6 which are preferably made of steel of a high yield strength, are arranged parallel to each other. The metallic elements 5 and 6 are obtained by making them undergo, previous to tempering, a torsion of about 40° at each middle part of the element so as to obtain a twisted assembly having opposite pitches. According to a possible embodiment, the two elements 5 and 6 form only one element such as a blade to which is imparted a torsional movement. The metallic element can have a rectangular or circular cross-section. A strip plate 7 perpendicular to one of the elements 5 or 6 at a point such as 9 belonging to the twisted part is made integral with that element by welding or any suitable means. An electric micro-contact 10 whose armature 11 is in the break position at a certain distance from a stop 12 which is integral with a housing 13 enclosing the load limiter, is arranged at one end of the strip plate 7. According to another embodiment of the invention, the micro-contact is integral with the housing 13 and its armature is placed facing the strip plate 7. The housing 13 is composed of two parts which can be fitted into each other, a top part 13' and a bottom part 13'' whose adjacent parts have a seal 14 made of rubber or the like.

The operation of the load limiter is as follows:

Under the effect of the stresses 3 and 4, a rotation by stretching of the twisted parts of the flexible elements 5 and 6 is produced. The strip plate 7 follows the rotating movement perpendicularly to the drawing sheet and the armature 11 of the micro-contact 10 comes into contact with the stop 12, this causing the setting off of the electrical contact. The calibrating of the device can be effected easily as a function of the load on account of the proportionality of the angle of rotation and of the load. During the stretching, the fixtures 1 and 2, as well as the ends of the elements 5 and 6, do not rotate; the two parts 13' and 13'' which can be fitted into each other move in the direction of the arrows 3 and 4, as do the fixtures 1 and 2.

Figure 2:
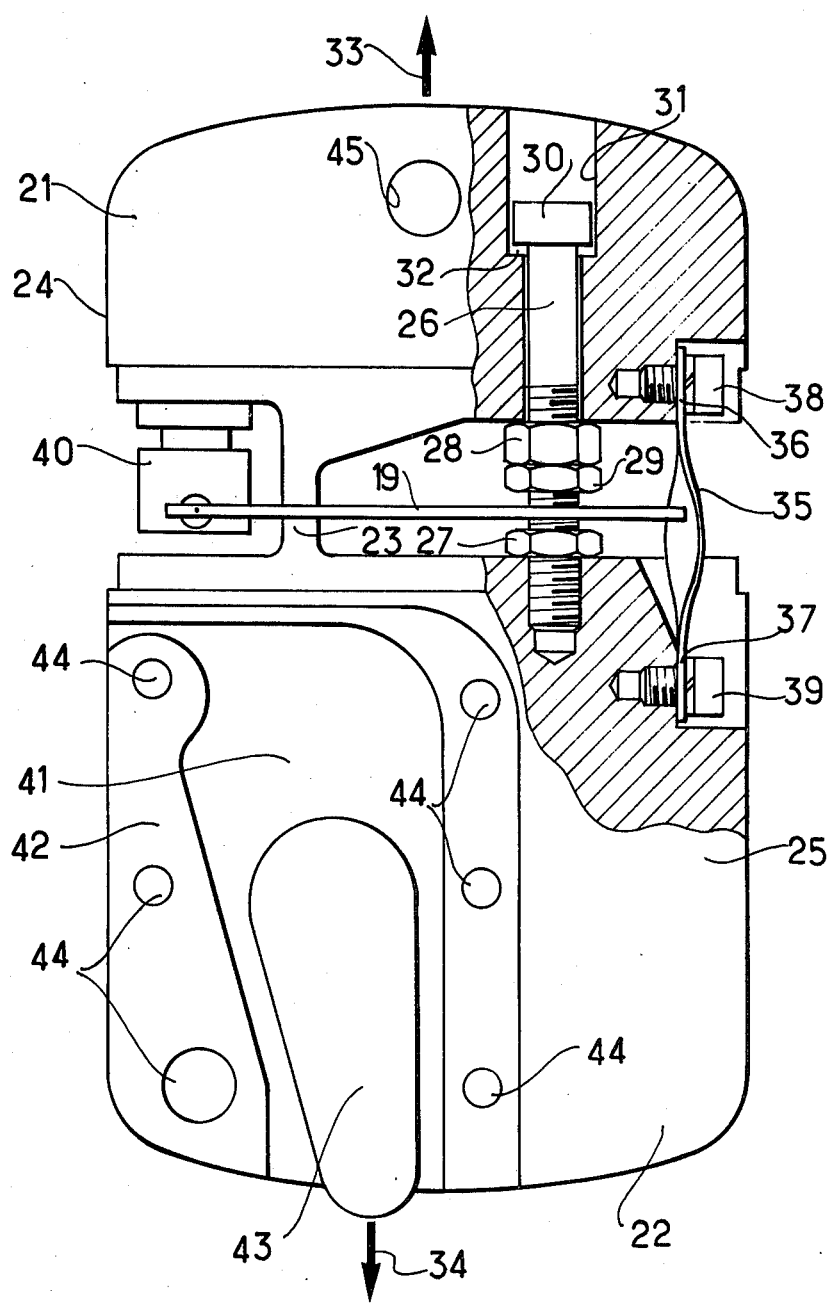
FIG. 2 shows diagrammatically a partial cross-section view of an example of another embodiment of a load limiter.

As may be seen in FIG. 2, the load limiter is constituted by an upper block 21 and a lower block 22 machined from a single part in such a way that there remains a common part 23 between the two blocks 21 and 22. In relation to the axis of symmetry of the two blocks, the common part 23 is situated in an eccentric position and is nearer to the left edge 24 than to the right edge 25. The common part 23 is relatively narrow in relation to the width of the two blocks 21 and 22. A safety bolt 26 screwed into the lower block 22, tightened by a nut 27 against the lower block 22 and by nuts 28 and 29 against the upper block 21 is arranged symmetrically with the common part 23, in relation to the mid-perpendicular of that width. That safety bolt 26 is used for providing an extra connection between the two blocks 21 and 22. It has the particularity of providing, between its head 30 and the base of its recess 31, an operational play 32 enabling the two blocks 21 and 22 to move in relation to each other under the effect of the forces represented by the top arrow 33 and the bottom arrow 34. The flexible system 35, twisted as described with reference to FIG. 1, is arranged, near the edge 25, in the free space situated between the two blocks 21 and 22. The two yokes 36 and 37 of the twisted flexible system 35 are fixed respectively on the blocks 21 and 22 by two screws 38 and 39. A strip plate 19 fixed on the flexible element 35 moves perpendicularly to the plane of the drawing under the effect of the forces 33 and 34. The strip plate 19 is used for the electrical cutting out of a micro-contact 40 whose body is connected with the block 21, for example in the space comprised between the edge 24 and the common part 23.

The arranging of the flexible element 35 relatively far from the common part 23 and the relatively great length of the strip plate 19 enable the amplifying of the deformation phenomenon on the two blocks 21 and 22 under the effect of the stresses 33 and 34. The flexible element 35 can consequently have small dimensions. Indeed, the line of the stresses does not pass completely through the flexible element 35.

A hollowed out part 41, limited by fixed walls and a removable cam 42 whose shape widens progressively towards the base is cut out in the lower left-hand part of the block 22. A removable blocking wedge 43 is arranged inside a loop of the cable (not shown) and is used for blocking that cable under the effect of the stress 34.

The hollowed out part, the cam, the wedge and the loop are enclosed by a lid, not shown, by means of screws whose recesses bear a fixing orifice 45 which enables the load limiter to be hooked to a fixed point of the hoist.

The case in FIG. 2 corresponds to a load limiter in which the cable coming from the pulley block supporting the hook is clamped in the lower part of the load limiter by means of a blocking wedge and in which the top part of the load limiter is attached directly to the fixed point of the hoist.

Figure 3:
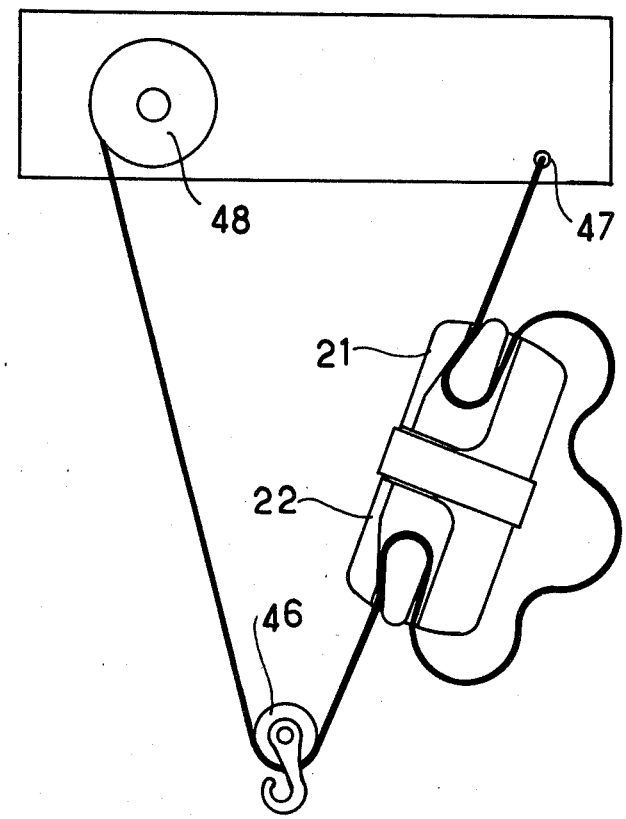
FIG. 3 shows a general diagrammatic view of a winch with its load limiter.

The case in FIG. 3 is different. In the latter, the bottom part 22 of the load limiter has a system with a blocking wedge clamping the cable coming from the pulley block 46 and the top part 21 of the load limiter is also provided with a system having a blocking wedge. The cable passes inside the bottom part of the load limiter, with the spring not stretched, towards the top part of the load limiter, where it is clamped by a second blocking wedge, then the cable is made fast to the fixed point 47 of the hoist 48. In that example, it is not useful to cut the cable to adapt the load limiter onto the hoist, a part of the cable between the two blocking wedges being non-active.

According to another embodiment, not shown, the top part of the limiter is provided with a fixing orifice and the bottom part is provided with a pulley enabling the connecting by two cables with the pulley block supporting the hook.

The load limiter according to the invention, based on the principle of the rotating of a twisted system caused by an axial tension, enables a movement perpendicular to the line of action of the stresses, this making it possible to produce a device which has less bulk than conventional devices.

Applications come within the domain of lifting and handling devices.

I claim:

1. Load limiter for lifting devices, setting off an electric signal when a vertical tensile stress is greater than a maximum value and constituted by a housing, a flexible system subjected to the said vertical tensile stress adapted to actuate, due to its movement, an electric contact switch, characterized in that the said flexible system is previously twisted in its middle part and stretches by rotation in a plane perpendicular to the direction of the vertical stress.

2. Load limiter according to claim 1, characterized in that the said flexible system comprises a longitudinal metallic element previously deformed in its middle in a direction perpendicular to its length and to which is fixed a strip plate perpendicular to and integral with the deformed part of the element, the said strip plate being adapted, when rotating, to actuate the said electric contact switch.

3. Load limiter according to claim 2, characterized in that the said flexible system comprises two parallel longitudinal metallic elements spaced apart from each other, connected together at their ends to form an upper yoke and a lower yoke, each deformed at its middle by rotation in a direction perpendicular to its length and to which is fixed a strip plate perpendicular to and integral with the deformed part of the said elements, the said strip plate supporting an electric contact switch whose armature is adapted to be actuated at the time of rotation due to a stop integral with the said housing.

4. Load limiter according to claim 2, characterized in that the said electric contact switch is integral with the said housing, the armature of the electric contact switch being set off by the rotation of the said strip plate.

5. Load limiter according to claim 1, characterized in that the said flexible system is arranged laterally in relation to the axis of the said vertical stresses.

6. Load limiter according to claim 5, characterized in that it comprises a lower block and an upper block having a substantially parallelepipedical shape, fixed together by a common part whose width is narrow in relation to the horizontal width of the two blocks, the said common part being situated in a space comprised between a first vertical edge of the two blocks and the mid-perpendicular passing through the said horizontal width, the said flexible system being arranged on the second vertical edge opposite to the said first vertical edge in a space comprised between the two blocks.

7. Load limiter according to claim 6, characterized in that a connection element between the said two blocks is arranged between the said second vertical edge and the said mid-perpendicular, that connection element having a play enabling the said flexible system to be deformed notwithstanding.

8. Load limiter according to claim 6, characterized in that the said flexible system is provided with a strip plate parallel to the said horizontal width of the two blocks, adapted to actuate a micro-contact integral with one of the blocks and arranged between the said first vertical edge and the said common part.

9. Load limiter according to claim 6, characterized in that each of the said upper and lower blocks is provided with a hollowed out part whose axis is substantially that of the said common part, said hollowed out part having an outside edge stopped up by a removable cam and containing a blocking wedge adapted to block the lifting cable wound round the said wedge.

10. Load limiter according to claim 6, characterized in that the said upper block is provided with a fixing orifice and the lower block is provided with a hollowed out part whose axis is substantially that of the said common part, that hollowed out part having an outside edge which is stopped up by a removable cam and containing a blocking wedge adapted to block the lifting cable wound round the said wedge.

11. Load limiter according to claim 6, characterized in that the said upper block is provided with a fixing orifice and the said lower block is provided with a pulley.

* * * * *